(12) United States Patent  
Chou

(10) Patent No.: US 9,964,103 B2  
(45) Date of Patent: May 8, 2018

(54) AIR COMPRESSOR

(71) Applicant: Wen-San Chou, Tainan (TW)

(72) Inventor: Wen-San Chou, Tainan (TW)

(*) Notice: Subject to any disclaimer, the term of this patent is extended or adjusted under 35 U.S.C. 154(b) by 471 days.

(21) Appl. No.: 14/478,281

(22) Filed: Sep. 5, 2014

(65) Prior Publication Data

US 2015/0078920 A1  Mar. 19, 2015

(30) Foreign Application Priority Data

Sep. 13, 2013  (TW) .............................. 102133296 A

(51) Int. Cl.
| | |
|---|---|
| *F04B 49/00* | (2006.01) |
| *F04B 35/06* | (2006.01) |
| *F04B 49/10* | (2006.01) |
| *F04B 41/02* | (2006.01) |
| *G01L 19/06* | (2006.01) |
| *G01L 7/16* | (2006.01) |
| *F04B 49/08* | (2006.01) |
| *F04B 49/24* | (2006.01) |

(52) U.S. Cl.
CPC .............. *F04B 35/06* (2013.01); *F04B 41/02* (2013.01); *F04B 49/08* (2013.01); *F04B 49/10* (2013.01); *F04B 49/24* (2013.01); *G01L 7/166* (2013.01); *G01L 19/0618* (2013.01); *F04B 2205/04* (2013.01)

(58) Field of Classification Search
CPC .... F04B 49/10; F04B 53/106; F04B 2205/05; G01L 7/166; G01L 19/0618
See application file for complete search history.

(56) References Cited

U.S. PATENT DOCUMENTS

| | | | | | |
|---|---|---|---|---|---|
| 318,152 | A | * | 5/1885 | Willard ..................... | G01L 7/16 73/744 |
| 1,275,180 | A | * | 8/1918 | Ellis .......................... | G01L 7/16 73/744 |
| 2,038,928 | A | * | 4/1936 | Farley ....................... | G01L 7/16 73/744 |
| 2,136,261 | A | * | 11/1938 | Anderson ............. | F16N 27/005 116/276 |
| 3,131,667 | A | * | 5/1964 | Sajeck .................... | G01L 19/08 116/34 R |
| 3,675,487 | A | * | 7/1972 | Mueller .............. | G01L 19/0007 137/517 |
| 3,678,754 | A | * | 7/1972 | Amir ....................... | G01F 1/386 73/744 |
| 3,779,081 | A | * | 12/1973 | Holtzman ................. | G01L 7/16 73/114.18 |
| 3,981,625 | A | * | 9/1976 | Wickenberg ............ | F04B 33/00 417/524 |
| 4,373,398 | A | * | 2/1983 | Ponczek ................. | G01L 7/084 73/431 |
| 4,449,412 | A | * | 5/1984 | Fallon ................ | G01L 19/0618 73/706 |

(Continued)

*Primary Examiner* — Charles Freay  
*Assistant Examiner* — Christopher Bobish

(57) ABSTRACT

An air compressor having a pen-type pressure gauge is disclosed and provided for measuring the pressure of the compressed air produced by air compressor as well as releasing air into an ambient environment when the pressure is greater than a predetermined maximum safety value, so as to achieve the operational safety without installing a separate safety valve and prevent an inflated object from damages.

11 Claims, 9 Drawing Sheets

(56) References Cited

U.S. PATENT DOCUMENTS

| | | | | |
|---|---|---|---|---|
| 4,460,018 A * | 7/1984 | Sweeney | ............ | G01L 19/0618 |
| | | | | 137/251.1 |
| 4,622,857 A * | 11/1986 | Nelson | .................... | G01L 7/163 |
| | | | | 116/34 R |
| 5,606,131 A * | 2/1997 | Pope | ................ | A61M 16/0078 |
| | | | | 73/744 |
| 5,655,887 A * | 8/1997 | Chou | ...................... | F04B 35/04 |
| | | | | 417/415 |
| 5,734,109 A * | 3/1998 | Thanscheidt | .......... | G01L 19/10 |
| | | | | 116/34 R |
| 5,894,093 A * | 4/1999 | Ferguson | ........... | G01L 19/0672 |
| | | | | 73/706 |
| 6,095,758 A * | 8/2000 | Chou | ...................... | F04B 35/04 |
| | | | | 417/374 |
| 6,135,725 A * | 10/2000 | Chou | ...................... | F04B 35/04 |
| | | | | 417/360 |
| 6,216,541 B1 * | 4/2001 | Carpenter | .............. | G01L 7/041 |
| | | | | 73/732 |
| 6,694,819 B1 * | 2/2004 | Gammon | ............... | G01L 7/166 |
| | | | | 73/744 |
| 8,297,944 B2 * | 10/2012 | Chou | ...................... | F04B 41/02 |
| | | | | 417/313 |
| 8,733,270 B2 * | 5/2014 | Chen | ....................... | G01L 7/163 |
| | | | | 116/272 |
| 9,011,118 B2 * | 4/2015 | Chou | ...................... | F04B 35/01 |
| | | | | 417/545 |
| 9,057,656 B2 * | 6/2015 | Chen | ...................... | G01L 7/166 |
| 2006/0277988 A1 * | 12/2006 | Huang | ................... | G01L 17/00 |
| | | | | 73/146.8 |
| 2013/0011283 A1 * | 1/2013 | Chou | ...................... | F04B 35/04 |
| | | | | 417/437 |
| 2016/0076534 A1 * | 3/2016 | Chou | ................... | F04B 33/005 |
| | | | | 73/168 |

\* cited by examiner

AIR COMPRESSOR

FIELD OF THE INVENTION

The present invention relates to an air compressor, in particular to an air compressor having a pen-type pressure gauge installed at one of the air output ducts of an air reservoir and the pen-type pressure gauge includes an over-pressure protection unit.

BACKGROUND OF THE INVENTION

A conventional air compressor simply has two air outlet ducts on the gas storage unit, and one duct is used for installing a circular-box pressure display meter and the other duct is connected with a hose having an air nozzle (wherein the air nozzle may be connected to an object to be inflated). Since there are only two air outlet ducts and thus the air compressor is incapable of being installed with a protection or safety device, the inventor of the present invention has developed an air compressor as disclosed in U.S. Pat. No. 7,462,018, wherein the air compressor comes with a structure comprising more than two ducts, wherein a safety valve is provided for relieving the pressure when an over-pressure condition of the air compressor occurs, so as to protect the object to be inflated. Since the conventional circular-box pressure meter is fixed to an external end of the duct directly by screwing means or bolts, and such connection method is undesirable, the inventor of the present invention has developed a pressure meter structure that can be assembled or removed quickly as disclosed in U.S. Pat. No. 8,297,944, and such patented invention allows users to install and remove various devices such as pressure meters, hoses, relief valves, etc, so as to provide a convenient and practical assembling process. However, the conventional air compressor still has a safety valve installed at one of the ducts to prevent the over-pressure issue, thus incurring a higher manufacturing cost for providing the protection effect. On the other hand, the conventional air compressor adopts a pointer-type pressure meter which is a circular-box device, and simply provides the functions of measuring the pressure of the compressed air and displaying the current pressure value. The conventional mechanical circular-box pressure meter does not have other new functions. FIGS. 7 to 9 show a conventional air compressor 7, which is equipped with a safety valve 77 and a circular-box pointer-type pressure meter 76. In operation, after the air compressor is started, a motor 70 drives a transmission mechanism 79 to have a piston conduct reciprocating motion in a cylinder 71 so to produce compressed air in an air reservoir 72 which includes a plurality of air outlet ducts 73, 74, 75, wherein the duct 73 is used for installing an inflating hose (not shown in the figure), the duct 74 is coupled to the circular-box pointer-type pressure meter 76, and the duct 75 is installed with a safety valve 77. Although the functional accessories including the hoses, pressure meter 76 and safety valve 77 can be assembled to the air reservoir 72 of the air compressor 7 directly and conveniently, yet when the compressed air produced in the air compressor 7 is greater than a predetermined safety tire-pressure of a car tire, the safety valve 77 is started to relieve the pressure. If the safety valve 77 fails to work properly, the car tire will be over-inflated or even has a blow-out, and furthermore, the manufacturing cost cannot be lowered.

SUMMARY OF THE INVENTION

Therefore, it is a primary objective of the present invention to overcome the aforementioned problems of the prior art by providing an air compressor, wherein the air compressor has an air reservoir with a duct that is coupled directly to a pressure gauge having an over-pressure protection unit, and the pressure gauge is provided for measuring the current pressure value as well as releasing air by the over-pressure protection unit when the pressure value reaches a predetermined maximum safety pressure value, and the air compressor does not require installing a separate pressure safety valve.

The second objective of the present invention is to provide an air compressor, wherein the pressure gauge of the air compressor is a pen-type pressure measuring device.

The third objective of the present invention is to provide an air compressor, wherein the pressure gauge of the air compressor includes an over-pressure protection unit which is a relief hole provided for releasing the over-pressure air into an ambient environment.

The fourth objective of the present invention is to provide an air compressor, wherein the pressure gauge of the air compressor comprises a cylindrical shell, which has an open end fastened by a cover and is provided at an opposite end with a connector for connection with one duct of the air reservoir of the air compressor. A hollow cylindrical body and first and second springs are installed in the cylindrical shell, wherein the first and second springs push the hollow cylindrical body towards the connector. In use, the compressed air produced by the air compressor can force the hollow cylindrical body against the first and second springs to move towards the cover. The linear displacement of the hollow cylindrical body corresponds to the pressure of the compressed air being measured.

The fifth objective of the present invention is to provide an air compressor, wherein the pressure gauge of the air compressor has a transparent cylindrical shell provided thereon with a scale display, and has a hollow cylindrical body and first and second springs installed in the transparent cylindrical shell, wherein the hollow cylindrical body is provided with a colored O-ring, whereby a user can see, inside the transparent cylindrical shell, the colored O-ring aligned with a corresponding number of the scale display, which represents the pressure of the compressed air produced by the air compressor.

The sixth objective of the present invention is to provide an air compressor, wherein the pressure gauge is provided with a pair of opposite U-shaped clips at two sides of the connector of the cylindrical shell, whereby the pressure gauge can be quickly and easily connected to one duct of the air reservoir of the air compressor.

DESCRIPTION OF THE PREFERRED EMBODIMENTS

The aforementioned and other objectives and advantages of the present invention will become clearer in light of the following detailed description of an illustrative embodiment of this invention described in connection with the drawings. It is intended that the embodiments and drawings disclosed herein are to be considered illustrative rather than restrictive.

Figure 1:
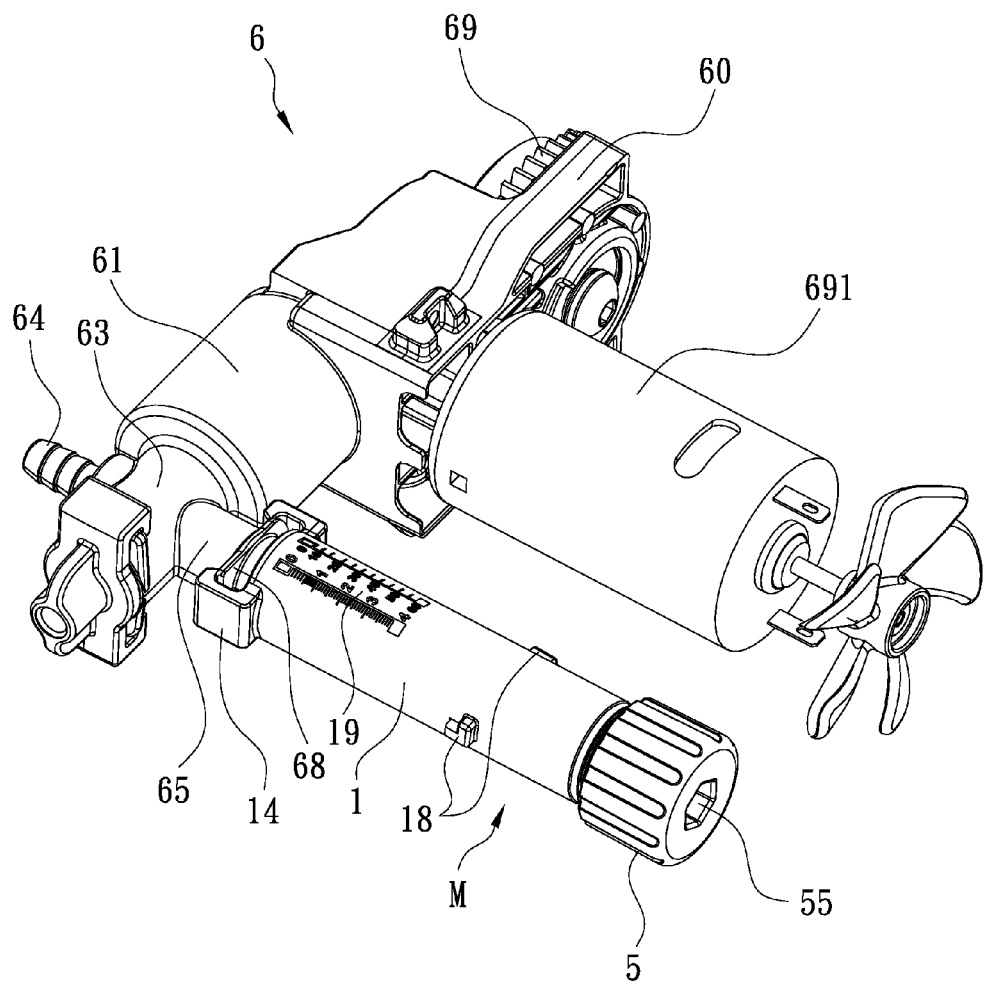
FIG. 1 is a perspective view of an air compressor of the present invention.
Figure 2:
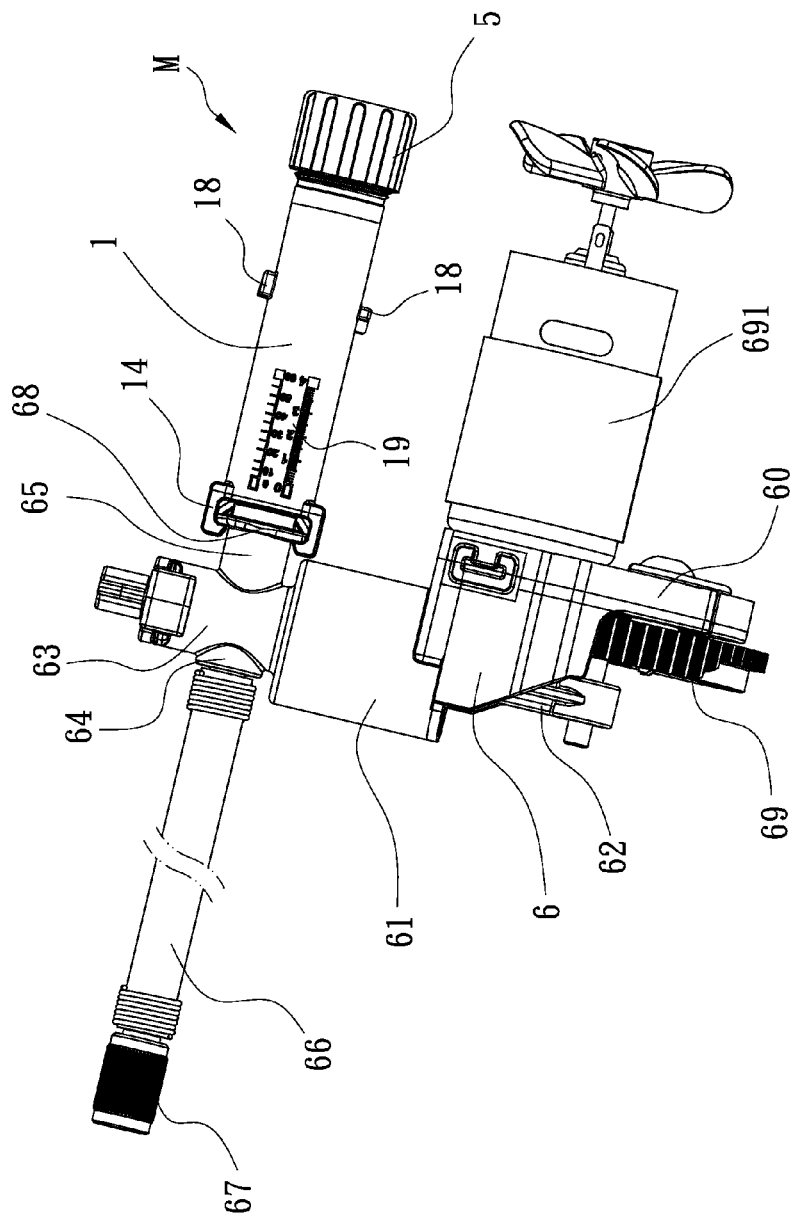
FIG. 2 is a schematic planar view of the air compressor of the present invention.
Figure 6:
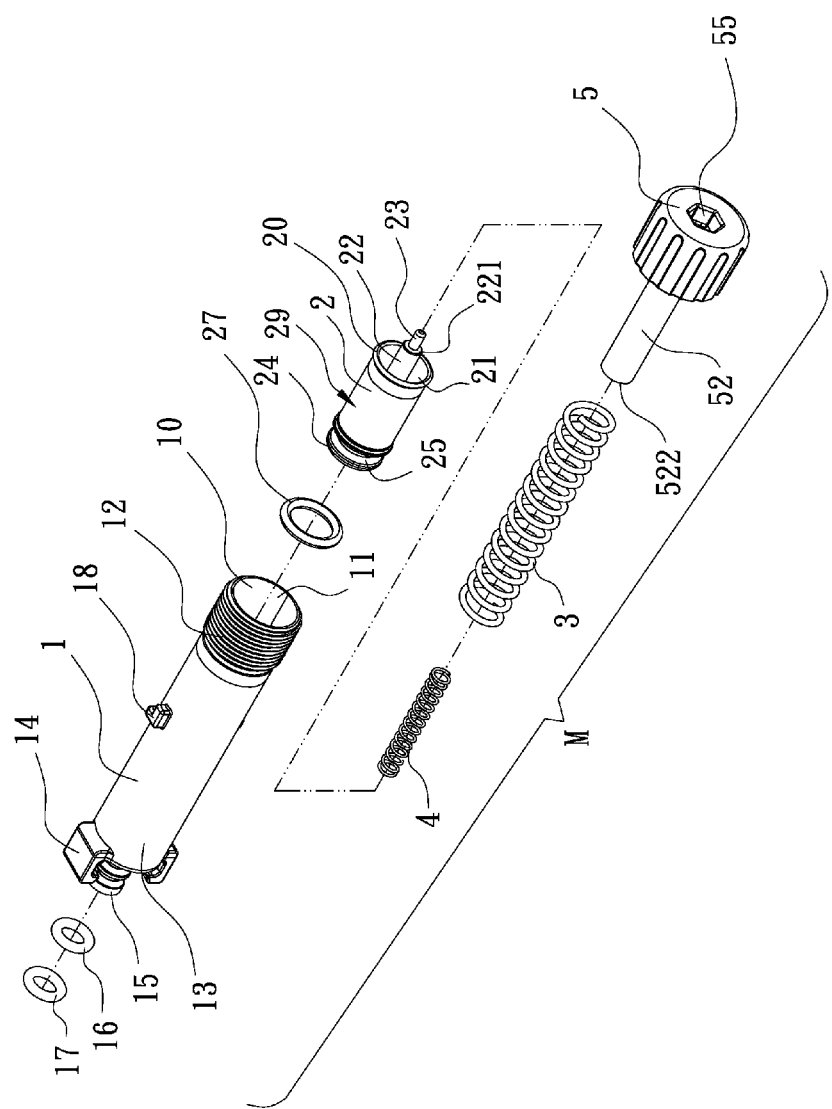
FIG. 6 is an exploded view of the pressure gauge of the present invention.
Figure 7:
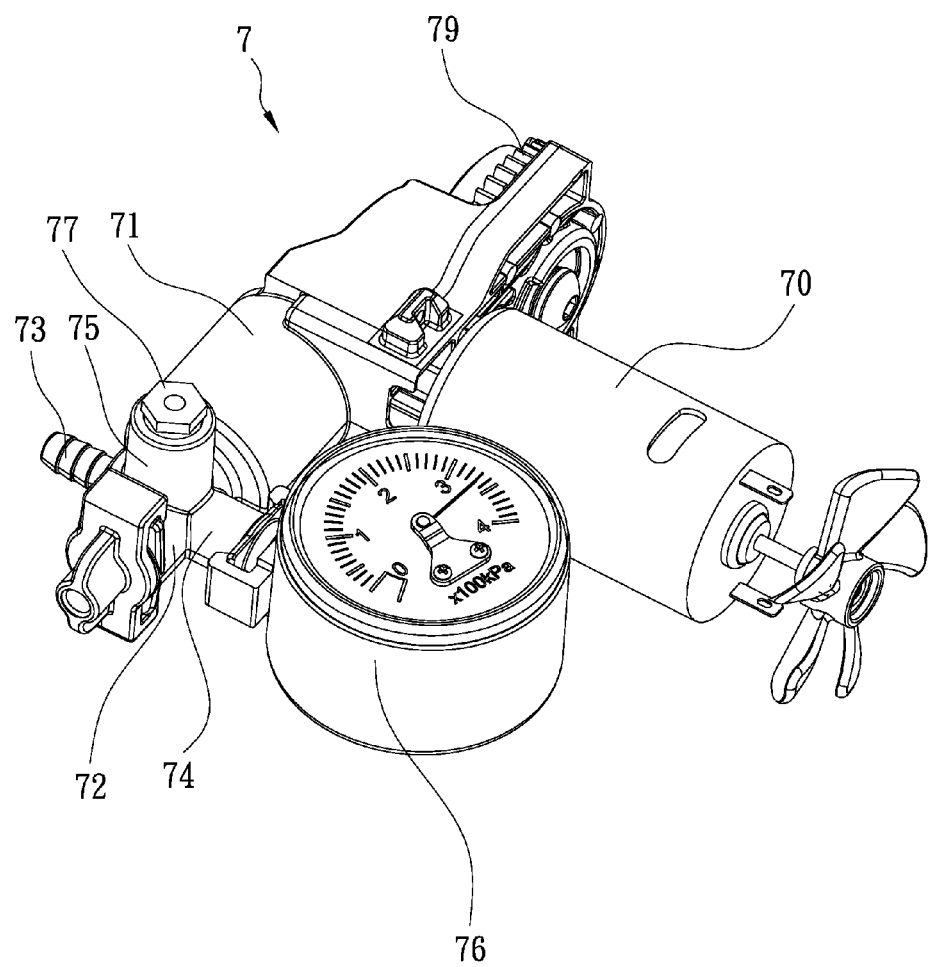
FIG. 7 is a perspective view of a conventional air compressor, wherein a pointer-type pressure gauge and a safety valve are installed.
Figure 8:
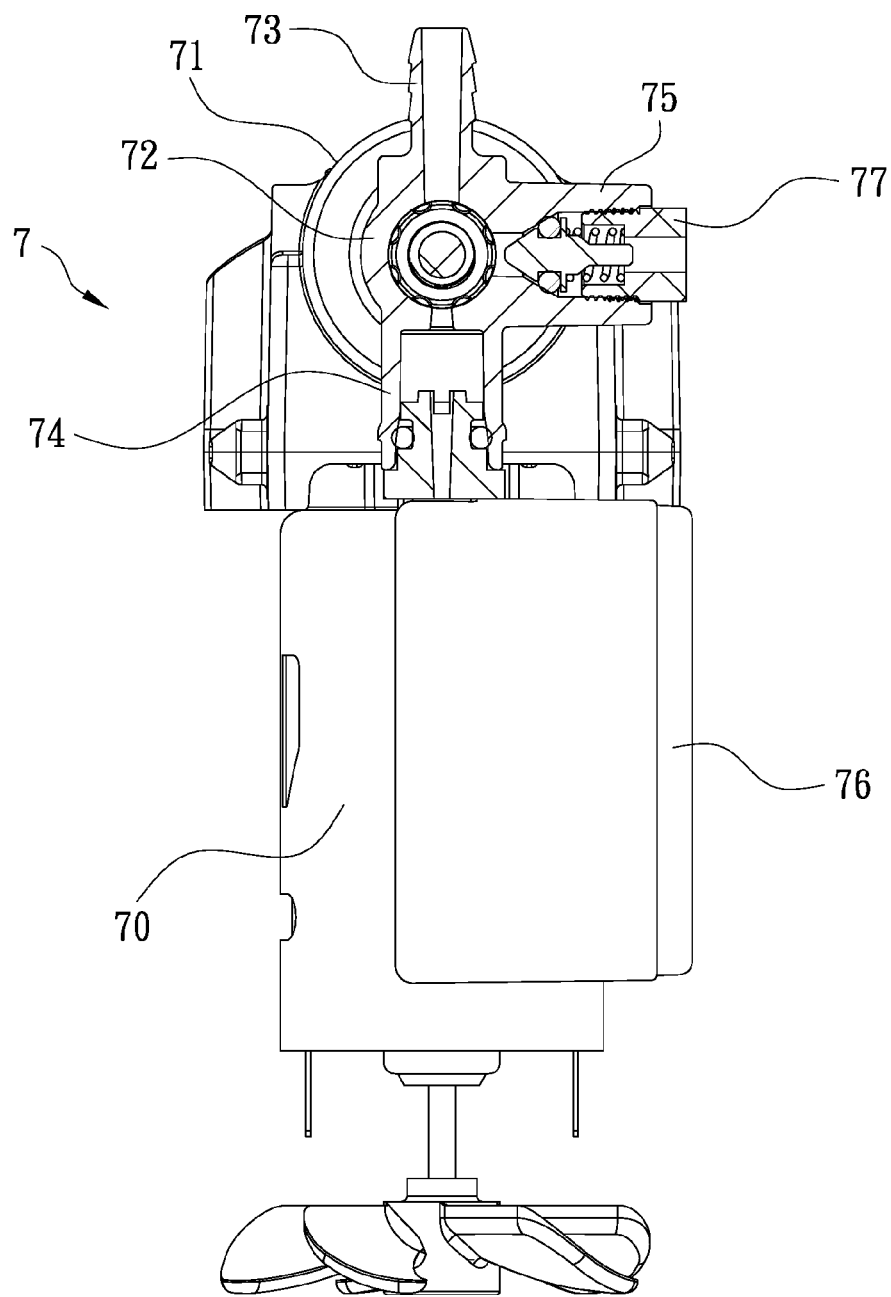
FIG. 8 is a sectional view of the conventional air compressor.
Figure 9:
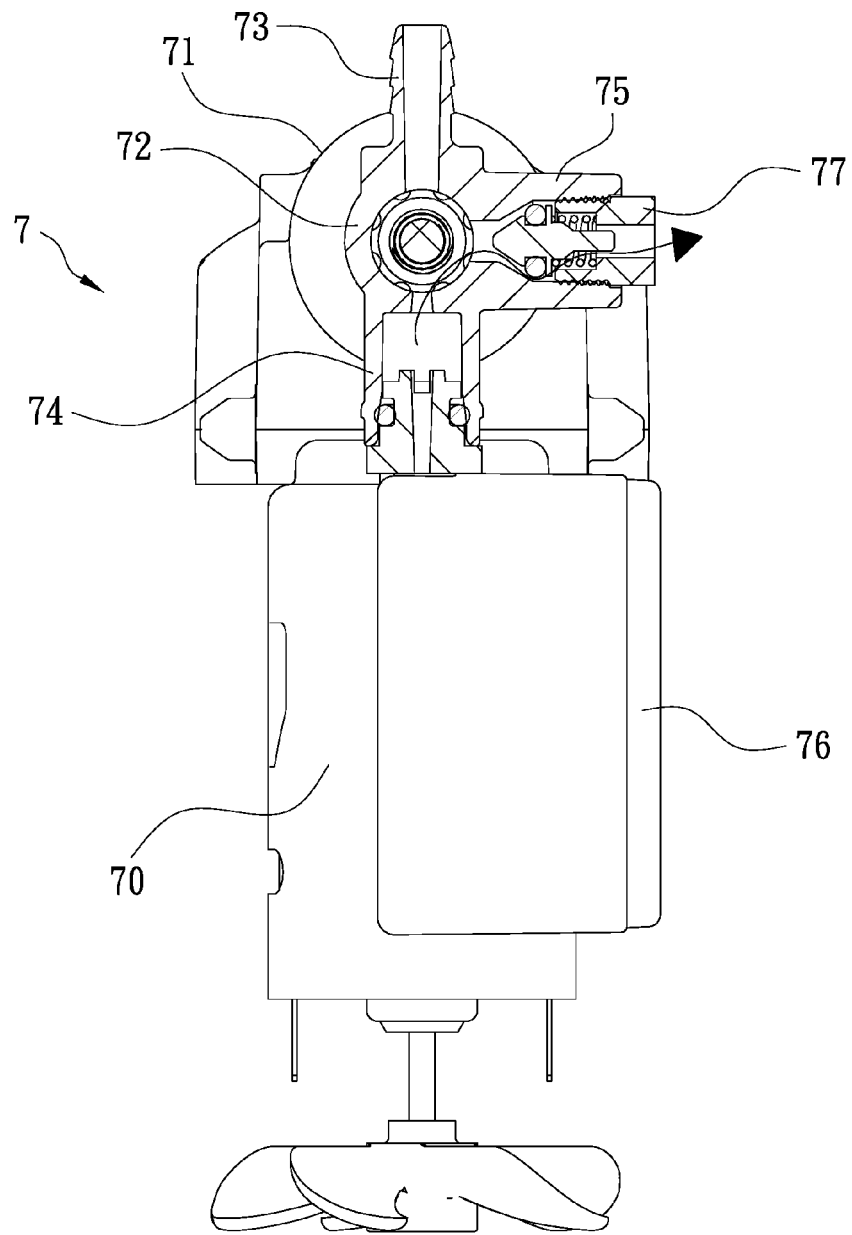
FIG. 9 is a schematic view showing the operation of the safety valve of the conventional air compressor.

One of the technical characteristics of the present invention is that a pressure gauge M with an over-pressure protection unit is connected to an air compressor 6, so that the air compressor 6 does not require installing a separate safety valve. The other technical characteristic of the present invention is that the pressure gauge M uses a linear shifter 29 to indicate the pressure value (see FIG. 6), and the pressure gauge M is not a circular-box pointer-type pressure meter (or pressure gauge), but it is a pen-type pressure gauge. With reference to FIGS. 1 and 2 for the basic structure of an air compressor of a preferred embodiment of the present invention, the air compressor 6 comprises a substrate 60, a motor 691 coupled onto the substrate 60, a transmission mechanism 69 which is a transmission gear set, and a cylinder 61 extended from the substrate 60 and having an air reservoir 63, and the air reservoir 63 includes a plurality of ducts 64, 65. Wherein, the duct 64 is connected with a hose 66 which has an air nozzle 67 installed at an end of the hose 66, and the air nozzle 67 may be combined with an object to be inflated or requiring compressed air. For example, the object is a car tire that requires air inflation. The duct 65 is combined directly with a pen-type pressure gauge M, which can be connected with or disconnected from the duct 65 quickly, as disclosed by the inventor of the present invention in U.S. Pat. No. 8,297,944. The cylinder 61 includes a piston 62 installed therein, and the piston 62 is driven by the transmission mechanism 69 and the motor 691 to produce compressed air in the air reservoir 63 and to deliver compressed air from the ducts 64, 65 of the air reservoir 63 to other functional accessories. When the pressure value is greater than a predetermined maximum safety pressure value, the pressure gauge M turns on an over-pressure protection unit, so that the air compressor 6 of the present invention does not need a separate pressure safety valve or relief valve.

In FIGS. 3 to 6, the pressure gauge M of the present invention uses a linear shifter 29 to indicate a pressure value, and the design of using the linear shifter 29 to indicate the pressure value breaks through the operation method of the conventional pointer-type or digital pressure meters (or pressure gauges). The pressure gauge M of the present invention is not a circular-box pointer-type pressure meter (or pressure gauge) but a pen-type pressure gauge. The pressure gauge M of the present invention comprises a cylindrical shell 1, and the nature of the cylindrical shell 1 is equivalent to the cylinder of a pump, and the cylindrical shell 1 is a transparent pen having an internal chamber 11 with a circular caliber, one end of the cylindrical shell 1 is an open end 10 provided with male threads 12, the other end of the cylindrical shell 1 is a rear end 13 provided with a pair of opposite U-shaped clips 14, and a connector 15 is formed at the center of an outer side of the rear end 13, wherein the two opposite U-shaped clips 14 are located at two sides of the connector 15, and the connector 15 has an inner channel 150 communicating with the internal chamber 11 of the cylindrical shell 1, and the connector 15 has two separate O-rings 16, 17 installed thereon. The cylindrical shell 1 has a scale display 19 with a numeric calibration provided at a position near the rear end 13 of the cylindrical shell 1 and has an over-pressure protection unit for releasing air. In a preferred embodiment of the present invention, the over-pressure protection unit is a relief hole 191, and the middle section of the cylindrical shell 1 has two opposite wing blocks 18.

The linear shifter 29 is installed in the internal chamber 11 of the cylindrical shell 1. When the compressed air produced by the air compressor 6 acts on the rear end 13 of the cylindrical shell 1, the linear shifter 29 is pushed to perform a linear displacement, and the moving distance of the linear shifter 29 indicates the current pressure value. In a preferred embodiment of the present invention, the shifter 29 is formed into a hollow cylindrical body 2, and an end of the hollow cylindrical body 2 is an open end 20, and the other end of the hollow cylindrical body 2 is a base 24. The hollow cylindrical body 2 defines therein an internal chamber 21. A large central shaft column 22 is formed integrally with the hollow cylindrical body 2, wherein the large central shaft column 22 extends from an inner surface of the base 24 to a distal end which goes beyond the open end 20 (see FIGS. 3 and 4). A small central shaft column 23 is formed integrally with the large central shaft column 22 and extends from the distal end of the large central shaft column 22 to define a step 221 between the large central shaft column 22 and the small central shaft column 23. The large central shaft column 22 is formed with a base portion 223 which is formed integrally with the base 24 of the hollow cylindrical body 2, wherein the base portion 223 has a diameter greater than the large central shaft column 22, and a circular groove 222 is defined between the hollow cylindrical body 2 and the base portion 223 of the large central shaft column 22. A cavity 26 is defined at an outer surface of the base 24 of the hollow cylindrical body 2, which has a diameter greater than the inner channel 150 of the connector 15 of the cylindrical shell 1. A circular groove 25 is defined at a peripheral surface of the base 24 for receiving therein a colored O-ring 27. The hollow cylindrical body 2 can be accommodated into the internal chamber 11 of the cylindrical shell 1, and the base 24 abuts against the bottom of the internal chamber 11, and the inner channel 150 of the connector 15 is communicated with the cavity 26 of the base 24, so that the compressed air produced by the air compressor 6 passes through the inner channel 150 to enter the cavity 26 to apply a pressure onto the hollow cylindrical body 2 so that the hollow cylindrical body 2 can be moved more easily in the internal chamber 11 of the cylindrical shell 1 at the initial moment when the air compressor is started.

A first spring 3, which has an external diameter close to the internal chamber 21 of the hollow cylindrical body 2, is fitted in the internal chamber 21 of the hollow cylindrical body 2 around the large central shaft column 22, wherein one end of the first spring 3 is received in the circular groove 222.

Figure 5:
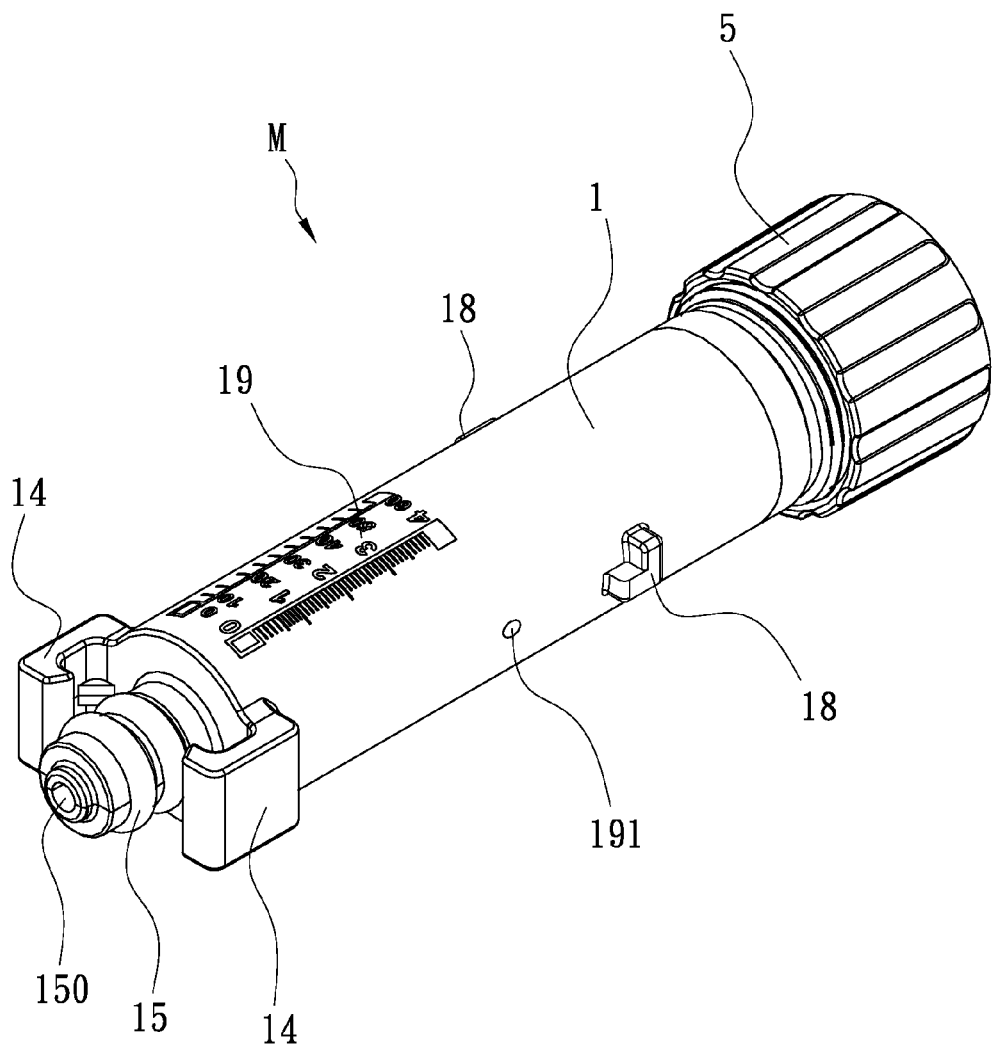
FIG. 5 is a perspective view of the pressure gauge of the present invention.

A cover 5 has a central base 51 formed integrally with a central barrel 52 and defines a ring-shaped accommodation space 53 around the central base 51. The central barrel 52 has a diameter less than the central base 51, thus defining a step 511 therebetween. The diameter of the central barrel 52 is less than the internal diameter of the first spring 3. The central base 51 defines therein a channel 54 and a through hole 55 communicating with the channel 54. The central barrel 52 defines an internal chamber 520 communicating with an opening 521 at a top end 522 and communicating with the channel 54 of the base 51, and the central barrel 52 has a diameter greater than the large central shaft column 22 of the hollow cylindrical body 2. In addition, the cover 5 is provided with female threads 50 at an inner surface that defines the ring-shaped accommodation space 53. Another end of the first spring 3 abuts against the step 511. A second spring 4, which has an elasticity coefficient less than the first spring 3 and has an external diameter close to the internal chamber 520 of the central barrel 52, is installed in the internal chamber 520 of the central barrel 52, wherein an end of the second spring 4 abuts against the central base 51. After the cover 5 is screwed and coupled to the open end 10 of the cylindrical shell 1 through the engagement of the female threads 50 and the male threads 12, the other end of the second spring 4 is fitted around the small central shaft column 23 and abuts against the step 221 between the large central shaft column 22 and the small central shaft column 23. After the cylindrical shell 1, hollow cylindrical body 2, first spring 3, second spring 4, colored O-ring 27, O-ring 16, 17 and cover 5 are assembled, the pressure gauge M as shown in FIG. 5 is formed.

In this embodiment, the duct 65 of the air compressor 6 as shown in FIGS. 1 and 2 has a rectangular coupling plate 68. In use, the two opposite U-shaped clips 14 can hold the rectangular coupling plate 68 by rotating the pressure gauge M, so that the pressure gauge M can be quickly connected with the duct 65.

When the pressure gauge M of the present invention is applied to an air compressor 6 installed on a motor vehicle, where a box is provided for installing the air compressor 6 and the pressure gauge M. To facilitate fixing the pressure gauge M to the box, the pressure gauge M is provided with a pair of opposite wing blocks 18, which can be engaged with ribs or recesses provided at the box.

Figure 3:
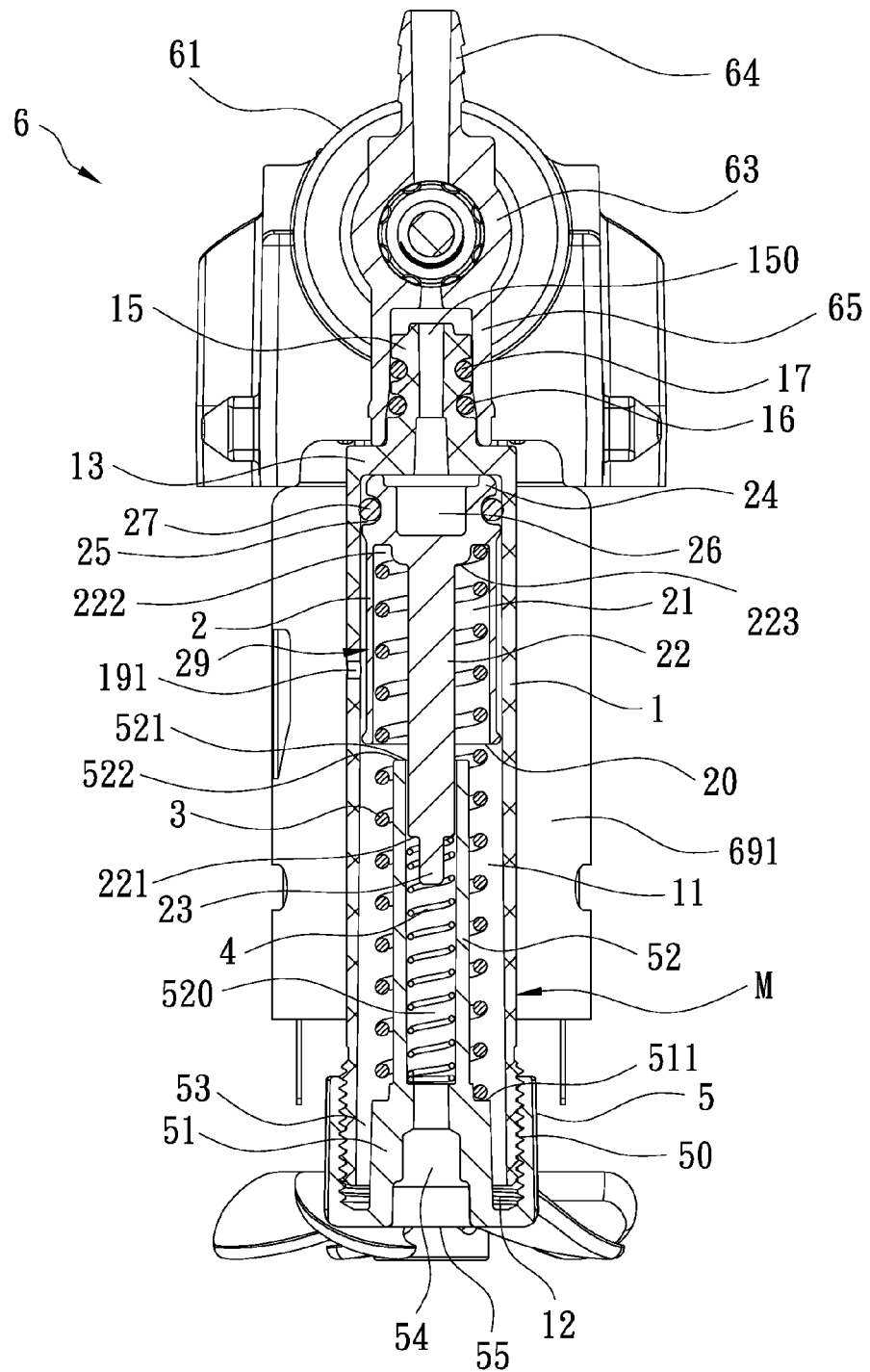
FIG. 3 is a sectional view of a pressure gauge installed at the air compressor of the present invention.
Figure 4:
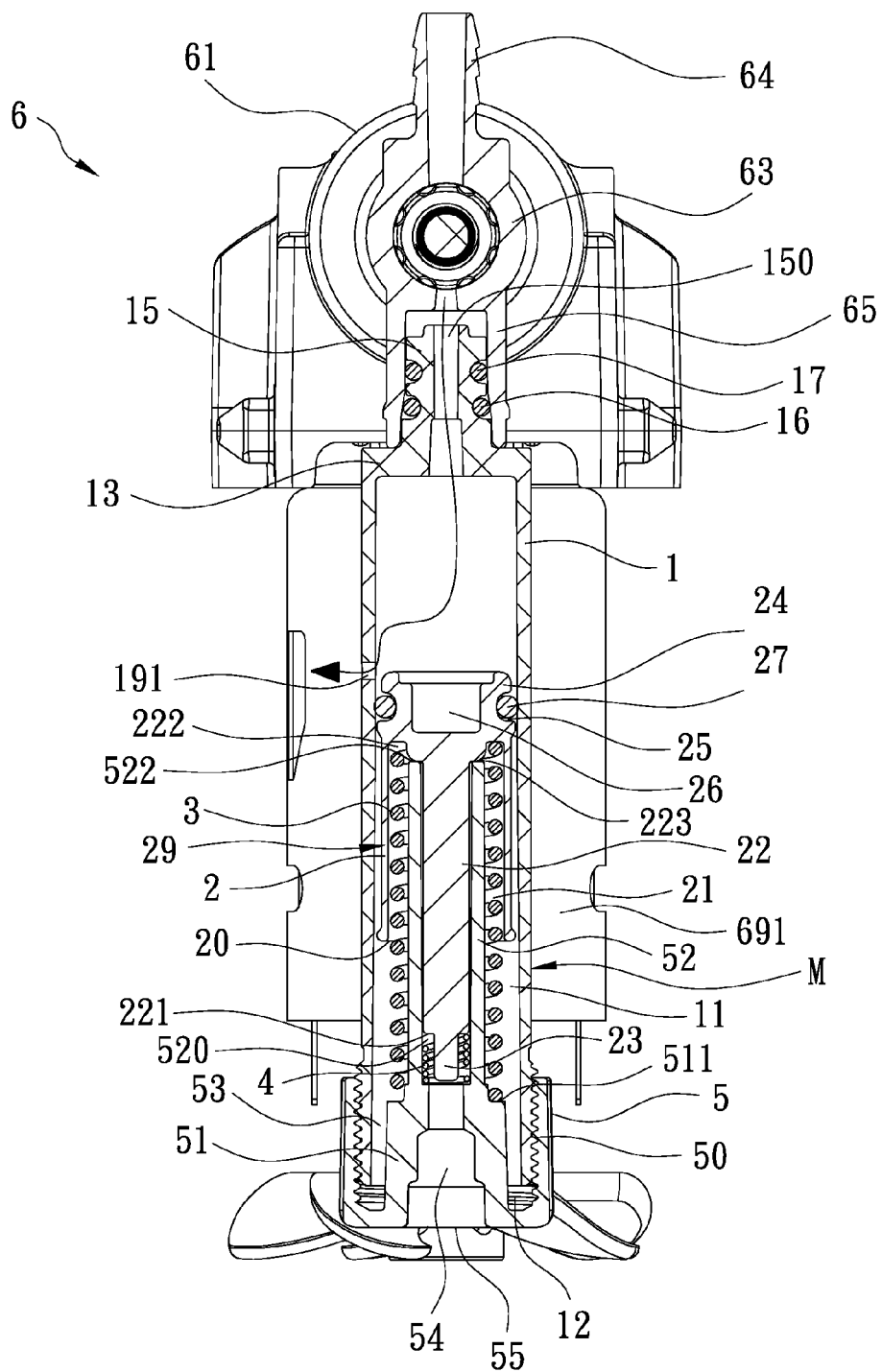
FIG. 4 is a sectional view showing the operation of the pressure gauge installed at the air compressor of the present invention.

In use, the compressed air from the duct 65 can pass through the inner channel 150 of the connector 15 of the cylindrical shell 1 to enter the cavity 26 of the cylindrical shell 1 of the pressure gauge M to force the hollow cylindrical body 2 against the first spring 3 as well as the second spring 4. The compressed air is inputted continuously to push the hollow cylindrical body 2 to move towards the cover 5. The current pressure value can be indicated by a corresponding number of the scale display 19 aligned with the colored O-ring 27, and the process of measuring the pressure of the compressed air by the pressure gauge M is shown in FIGS. 3 and 4, and the measurement continues until the object to be inflated is inflated completely. After the pressure gauge M is detached from the object to be inflated, outside air enters the cylindrical shell 1 via the through hole 55 and the channel 54 of the cover 5, the restoring force of the first spring 3 and the second spring 4 enables the hollow cylindrical body 2 to return to its original position. For safety purpose, when the pressure value of the compressed air is greater than the predetermined maximum safety pressure value, the colored O-ring 27 installed on the base 24 of the hollow cylindrical body 2 has passed the relief hole 191, so that the compressed air continuously entering into the interior of the pressure gauge M can be released into an ambient environment to prevent damages to the object to be inflated. On the other hand, when an over pressure occurs in an inflation stage due to improper operation, the top end 522 of the central barrel 52 of the cover 5 abuts against the base portion 223 of the base 24 of hollow cylindrical body 2, and this design can protect the first spring 3 and the second spring 4 from elastic fatigue and over compression.

In summation of the description above, one of the technical characteristics of the present invention is that an air compressor 6 is connected to a pressure gauge M having an over-pressure protection unit, so that the air compressor 6 does not require the installation of a separate safety valve. The other technical characteristic is that the pressure gauge M of the present invention uses a linear shifter 29 to indicate a pressure value, and the linear shifter 29 can perform a linear movement, and the pressure gauge M is not a circular-box pointer-type pressure meter (or pressure gauge), but it is a pointer-type pressure gauge. Not only does the present invention have a structural design different from the prior art, but it also measures a pressure value more precisely and sensitively. In the meantime, an over-pressure protection unit is provided for preventing an over-pressure inflation operation.

What is claimed is:

1. An air compressor including a substrate, a motor coupled onto the substrate, a transmission mechanism driven by the motor, a cylinder extended from the substrate and having an air reservoir, a plurality of ducts formed at the air reservoir, a piston installed in the cylinder and driven by the transmission mechanism to produce compressed air in the air reservoir, the air compressor characterized in that a pressure gauge is directly coupled to one of the ducts, wherein:

the pressure gauge includes a cylindrical shell, a linear shifter, a first spring, a second spring, and a cover, the cylindrical shell provided with an open end and a connector opposite to the open end, the connector adapted to be connected with one duct of the reservoir, the cylindrical shell defining therein an internal chamber and a relief hole communicating with the internal chamber of the cylindrical shell, the internal chamber communicating with an inner channel of the connector and opening out at the open end, the cylindrical shell provided thereon with a scale display;

the linear shifter is formed into a hollow cylindrical body having a base at one end and an open end opposite to the base and defining therein an internal chamber opening out at the open end, a large central shaft column formed integrally with the hollow cylindrical body and extending from an inner surface of the base to a distal end, a small central shaft column formed integrally with the large central shaft column and extends from the distal end and thus a step is formed between the large central shaft column and the small central shaft column, the hollow cylindrical body being movably disposed in the internal chamber of the cylindrical shell;

the cover has a central base formed integrally with a central barrel and defines a ring-shaped accommodation space around the central base, the central base defining therein a channel and a through hole communicating with the channel, the central barrel defining therein an internal chamber communicating with the channel of the central base and having a diameter greater than the diameter of the large central shaft column of the hollow cylindrical body;

the first spring is fitted in the internal chamber of the hollow cylindrical body around the large and small central shaft columns; and the second spring having an elasticity coefficient less than the first spring is fitted in the internal chamber of the central barrel of the cover;

wherein the cover is fastened to the cylindrical shell such that the large central shaft column of the hollow cylindrical body is inserted into the internal chamber of the central barrel; a first end of the second spring abuts against the step formed between the large and small central shaft columns while a second end of the second spring abuts against the central base of the cover; the first spring is fitted around the central barrel of the cover, a first end of the first spring abutting against the inner surface of the base of the hollow cylindrical body while a second end of the first spring abutting against the central base of the cover;

whereby the linear shifter is forced by the compressed air from the air reservoir against the first and second springs until a balance is reached, and thus a pressure value corresponding to the compressed air is measured; in the event of the compressed air from the air reservoir being greater than a predetermined pressure, the linear shifter is forced by the compressed air to pass the relief hole so that the compressed air is released into an ambient environment by way of the relief hole.

2. The air compressor of claim 1, wherein the base of the hollow cylindrical body defines at an outer surface thereof a cavity, which communicates with the inner channel of the connector of the cylindrical shell and has a diameter greater than the inner channel.

3. The air compressor of claim 2, wherein the central barrel of the cover has an external diameter less than the central base of the cover and thus a step is formed between the central barrel and the central base; the second end of the first spring abutting against the step therebetween.

4. The air compressor of claim 3, wherein the large central shaft column is formed with a base portion which is formed integrally with the base of the hollow cylindrical body, the base portion having a diameter greater than the large central shaft column, thus defining a circular groove between the hollow cylindrical body and the base portion of the large central shaft column for receiving the first end of the first spring, the base portion of the large central shaft column capable of contacting a top end of the central barrel to stop a further movement of the hollow cylindrical body so that the first and second springs are protected from elastic fatigue and excessive compression.

5. The air compressor of claim 2, wherein the second spring has an external diameter close to the diameter of the internal chamber of the central barrel of the cover.

6. The air compressor of claim 2, wherein the cylindrical shell is provided with male threads at the open end while the cover is provided with female threads at an inner surface that defines the ring-shaped accommodation space, the cover being fastened to the cylindrical shell through engagement of the female threads of the cover and the male threads of the cylindrical shell.

7. The air compressor of claim 2, the cylindrical shell is made of transparent material, the base of the hollow cylindrical body defines a circular groove at a peripheral surface thereof, and a colored O-ring is provided at the circular groove; whereby a user can see, inside the transparent cylindrical shell, the colored O-ring being aligned with a corresponding number of the display scale which represents a pressure value of the compressed air from the air reservoir being currently measured.

8. The air compressor of claim 2, wherein one duct of the air reservoir is provided with a coupling plate, and the cylindrical shell is provided with a pair of opposite U-shaped clips at two sides of the connector, the U-shaped clips capable of quickly holding the coupling plate through rotation of the cylindrical shell, so that the pressure gauge can be quickly coupled to the air compressor.

9. The air compressor of claim 8, wherein the connector of the cylindrical shell is provided with one or more O-rings thereon.

10. The air compressor of claim 8, wherein the scale display is located close to the connector of the cylindrical shell.

11. The air compressor of claim 2, wherein the step between the large central shaft column and the small central shaft column is located outside the open end of the hollow cylindrical body.

* * * * *